(12) United States Patent
Sakaguchi

(10) Patent No.: US 9,115,760 B1
(45) Date of Patent: Aug. 25, 2015

(54) TAPERED ROLLER BEARING

(71) Applicant: JTEKT CORPORATION, Osaka-shi, Osaka (JP)

(72) Inventor: Masashi Sakaguchi, Yao (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/678,239

(22) Filed: Apr. 3, 2015

(30) Foreign Application Priority Data

Apr. 11, 2014 (JP) .................. 2014-082113

(51) Int. Cl.
*F16C 33/56* (2006.01)
*F16C 33/58* (2006.01)
*F16C 33/46* (2006.01)
*F16C 19/36* (2006.01)

(52) U.S. Cl.
CPC ............ *F16C 33/4682* (2013.01); *F16C 19/364* (2013.01); *F16C 33/4635* (2013.01)

(58) Field of Classification Search
CPC ............. F16C 33/4605; F16C 33/4623; F16C 33/4635; F16C 33/4641; F16C 33/4652; F16C 33/4682
USPC .................................. 384/571, 572, 574, 576
See application file for complete search history.

(56) References Cited

U.S. PATENT DOCUMENTS

| 4,523,862 | A | * | 6/1985 | Yasui et al. | 384/564 |
| 8,783,966 | B2 | * | 7/2014 | Schlegel et al. | 384/572 |
| 8,790,019 | B2 | * | 7/2014 | Fujiwara | 384/572 |
| 2010/0183257 | A1 | * | 7/2010 | Ueno | 384/576 |

FOREIGN PATENT DOCUMENTS

JP    H11-210759 A    8/1999

* cited by examiner

*Primary Examiner* — Phillip A Johnson
(74) *Attorney, Agent, or Firm* — Oliff PLC

(57) ABSTRACT

A front bearing (tapered roller bearing) includes an inner ring, an outer ring, a plurality of tapered rollers, and a cage. The cage includes nail portions each extending from a first annular section facing a roller small end face, which is a small diameter side end face of the tapered roller, to an axially inward small rib end face of a small rib portion. The nail portions each support the tapered roller so as to form a gap between the roller small end face and the small rib end face by contact between the nail portion and the small rib end face.

20 Claims, 5 Drawing Sheets

TAPERED ROLLER BEARING

INCORPORATION BY REFERENCE

The disclosure of Japanese Patent Application No. 2014-082113 filed on Apr. 11, 2014 including the specification, drawings and abstract is incorporated herein by reference in its entirety.

BACKGROUND OF THE INVENTION

1. Field of the Invention

The invention relates to a tapered roller bearing.

2. Description of Related Art

In the related art, a tapered roller bearing is known that includes an inner ring, an outer ring, a plurality of tapered rollers, and a cage. Such tapered roller bearing is used, for example, to support a shaft built in a gear mechanism of a transmission, a differential device, and the like in an automobile serving as a power transmitting device.

The tapered roller bearing pressures tapered rollers from an axial direction when the tapered rollers are assembled between the inner ring and the outer ring so that a shaft, rotatably supported by the relevant bearing, in a radial direction and an axial direction is accurately positioned and an run-out of the shaft is suppressed. The tapered rollers are each subjected to downward roller displacement of being sufficiently sunk until a roller large end face, which is a large diameter side end face of the tapered roller, contacts with a cone back face rib (hereinafter, referred to as a large rib) end face on an axially inward side of a large rib portion of the inner ring by such pressuring. In an assembled state in which a rolling contact surface of the tapered roller is brought into contact with raceway surfaces of the inner and outer rings in a deviated manner, a compression load is repeatedly applied to the rolling contact surface and the raceway surfaces of the inner and outer rings thus arising a concern for fatigue flaking (fatigue damage) at an early stage, and hence the downward roller displacement is required to suppress such early stage flaking.

An amount by which the tapered roller moves in the axial direction such that the roller large end face contacts with the large rib end face of the inner ring by the downward roller displacement is referred to as an upward roller displacement. In terms of design, the tapered roller bearing is set such that the length of the inner ring raceway surface of the inner ring (distance between cone front face rib (hereinafter referred to as small rib and large rib)) is larger than the length of the rolling contact surface of the tapered roller, and the upward roller displacement is determined by such setting. An example of a structure in which a convex portion is formed on an outer circumferential surface of the cage is disclosed as a technique for reducing the downward roller displacement failure caused by the variation in the pressuring (see e.g., Japanese Patent Application Publication No. 11-210759 (JP 11-210759 A)).

In the technique of JP 11-210759 A, however, the assembly efficiency degrades if the downward roller displacement takes a long time and thus a concern for increase in the manufacturing cost arises. A concern for the early stage flaking easily arises if the downward roller displacement is insufficient. Furthermore, since a plurality of the tapered rollers are disposed in the axial direction, the positions of all the tapered rollers with respect to the inner ring are assumed to be not uniform before the pressuring. A concern for the downward roller displacement failure caused by the variation in the positions of the tapered rollers thus arises. Such downward roller displacement failure is more significant when the tapered roller is deviated to a side opposite to the downward roller displacement direction in the assembly direction of the tapered roller bearing.

SUMMARY OF THE INVENTION

It is an object of the present invention to enhance a downward roller displacement performance by suppressing the upward roller displacement determined by the tapered roller and the inner ring.

According to an aspect of the present invention, a tapered roller bearing includes: an inner ring including an outer circumferential surface formed as an inner ring raceway surface in the shape of a conical surface, a small rib portion that projects radially outwardly in a small diameter side end of the inner ring raceway surface, and a large rib portion that projects radially outwardly in a large diameter side end of the inner ring raceway surface; an outer ring that is disposed concentrically on an outer circumference side of the inner ring and has an inner circumferential surface formed as an outer ring raceway surface in the shape of a conical surface; a plurality of tapered rollers disposed so as to be rollable in an annular space between the inner ring raceway surface and the outer ring raceway surface; and a cage that holds the respective tapered rollers in a plurality of pockets partitioned by annular sections disposed on both axial ends of the tapered rollers and a plurality of cage bar sections that couple the annular sections at the both axial ends and that are disposed in a circumferential direction at intervals. The cage includes a nail portion that extends from a first annular section facing a roller small end face, which is a small diameter side end face of the tapered roller, to an axially inward small rib end face of the small rib portion, and the nail portion supports the tapered roller so as to form a gap between the roller small end face and the small rib end face by contact between the nail portion and the small rib end face.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of a tapered roller bearing of the present invention will be hereinafter described with reference to FIGS. 1 to 6. The tapered roller bearing in the present embodiment will be described using a tapered roller bearing applied to a rear differential device of a differential device applied to a four-wheel drive automobile by way of example.

Figure 1:
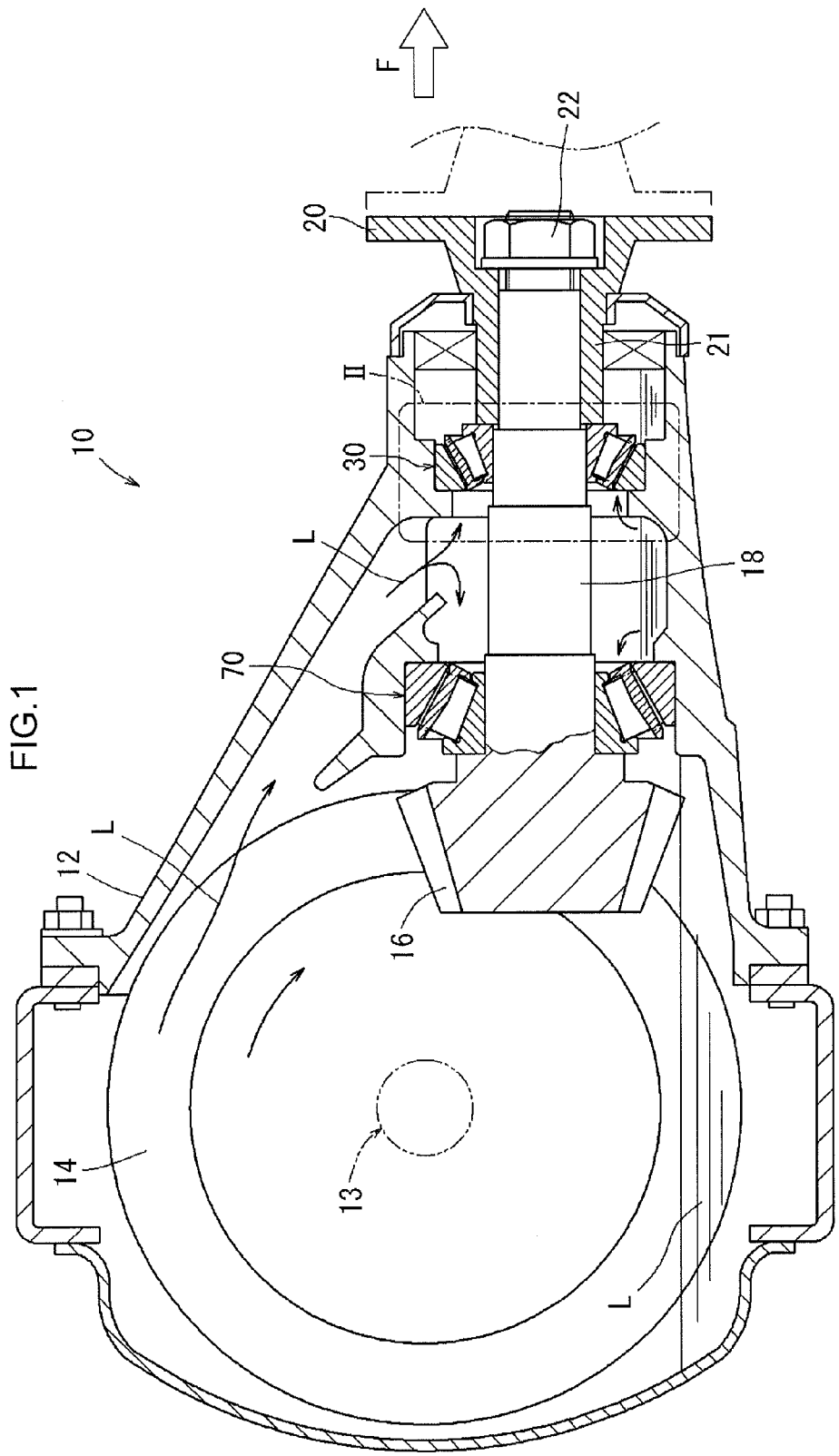
FIG. 1 is a cross-sectional view of a differential device of a present embodiment.

FIG. 1 is a cross-sectional view taken along an axis line direction, schematically showing an overall configuration of a differential device of the present embodiment. A differential ring gear 14 is equipped with a differential mechanism, but the illustration thereof is omitted in FIG. 1. In FIG. 1, a direction of an arrow F indicates a travel direction when the automobile moves forward.

As shown in FIG. 1, a differential device 10 (power transmission device) of the present embodiment has the differential ring gear 14 and a drive pinion 16 disposed to mesh with each other in a differential carrier 12. The drive pinion 16 is integrally formed with a drive pinion shaft 18 at a left end of the drive pinion shaft 18, when viewed in FIG. 1. A sleeve 21 of a companion flange 20 is coupled to the drive pinion shaft 18 at a right end of the drive pinion shaft 18 so as to be rotatable, when viewed in FIG. 1, by being fastened with a nut 22. The companion flange 20 is drivingly coupled to a front engine by way of a joint and a propeller shaft (not illustrated), so that the driving force of the front engine is transmitted thereto. The differential ring gear 14 is equipped with a differential mechanism (not illustrated), so that power is transmitted from the differential mechanism to right and left wheels. The drive pinion shaft 18 is supported by the differential carrier 12 with a front bearing 30 and a rear bearing 70. The front bearing 30 and the rear bearing 70 are both configured by the tapered roller bearing. The front bearing 30 and the rear bearing 70 have substantially a similar configuration, and thus the front bearing 30 will be described by way of example.

Figure 2:
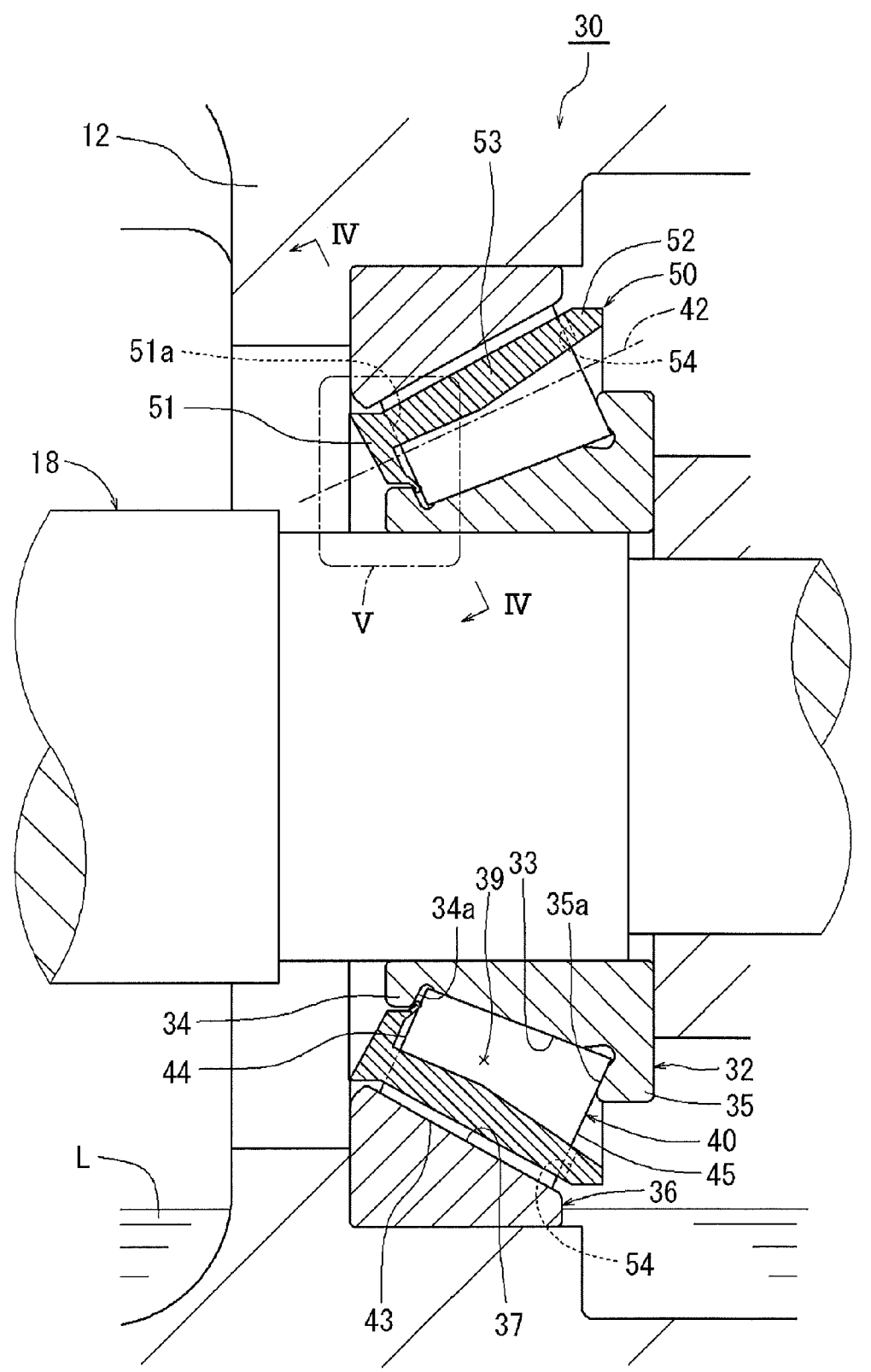
FIG. 2 is an enlarged cross-sectional view in which portion II of FIG. 1 is enlarged.

The front bearing 30 (tapered roller bearing) is generally mainly composed of an inner ring 32, an outer ring 36, tapered rollers 40, and a cage 50 as shown in FIG. 2.

The inner ring 32 has an outer circumferential surface formed as an inner ring raceway surface 33 in the shape of a conical surface. A radially outwardly projecting rib-like small rib portion 34 is formed in a small diameter end side of the inner ring raceway surface 33. A radially outwardly projecting rib-like large rib portion 35 is formed in a large diameter end side of the inner ring raceway surface 33.

The outer ring 36 is disposed concentrically on the outer circumference side of the inner ring raceway surface 33 of the inner ring 32 and to face the inner ring 32. The outer ring 36 has an inner circumferential surface formed as an outer ring raceway surface 37 in the shape of a conical surface. The tapered rollers 40 are disposed in an annular space 39 between the inner ring raceway surface 33 of the inner ring 32 and the outer ring raceway surface 37 of the outer ring 36 so as to be rollable.

The tapered rollers 40 each have a rolling contact surface 43 in the shape of a conical surface so as to be rollable while being sandwiched between the inner ring raceway surface 33 and the outer ring raceway surface 37. Each tapered roller 40 has a roller small end face 44 formed in a small diameter end side of the rolling contact surface 43. Each tapered roller 40 also has a roller large end face 45 formed in a large diameter end side of the rolling contact surface 43. The tapered rollers 40 are disposed such that the tapered rollers 40 are held in respective pockets 54 of the cage 50 and sandwiched between the inner ring 32 and the outer ring 36. The cage 50 holds the tapered rollers 40 such that the tapered rollers 40 can rotate and revolve between the inner ring raceway surface 33 of the inner ring 32 and the outer ring raceway surface 37 of the outer ring 36.

Figure 3:
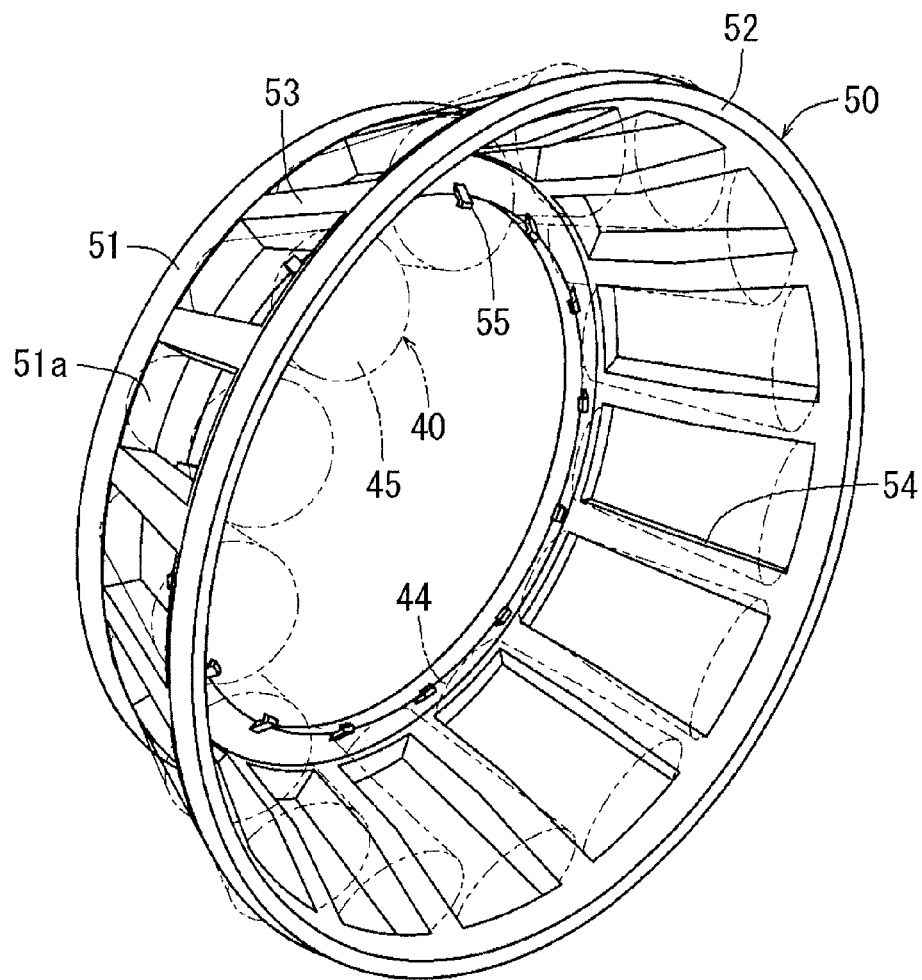
FIG. 3 is a perspective view of a cage in a tapered roller bearing of the present embodiment.

The cage 50 is formed from a synthetic resin (e.g., polyamide resin, polyphenylene sulfide resin, etc.) excelling in oil resistance and heat resistance. As shown in FIGS. 2 and 3, the cage 50 includes a first annular section 51 and a second annular section 52 on both axial sides of the tapered rollers 40. The first annular section 51 is disposed so as to face the roller small end faces 44 of the tapered rollers 40. The second annular section 52 is disposed so as to face the roller large end faces 45 of the tapered rollers 40. The first annular section 51 and the second annular section 52 are coupled by a plurality of cage bar sections 53 provided between the sections in the circumferential direction at intervals. The pockets 54 that accommodate the respective tapered rollers 40 are partitioned by the first annular section 51, the second annular section 52, and the cage bar sections 53, so that the pockets 54 are formed as rectangular open holes.

Figure 5:
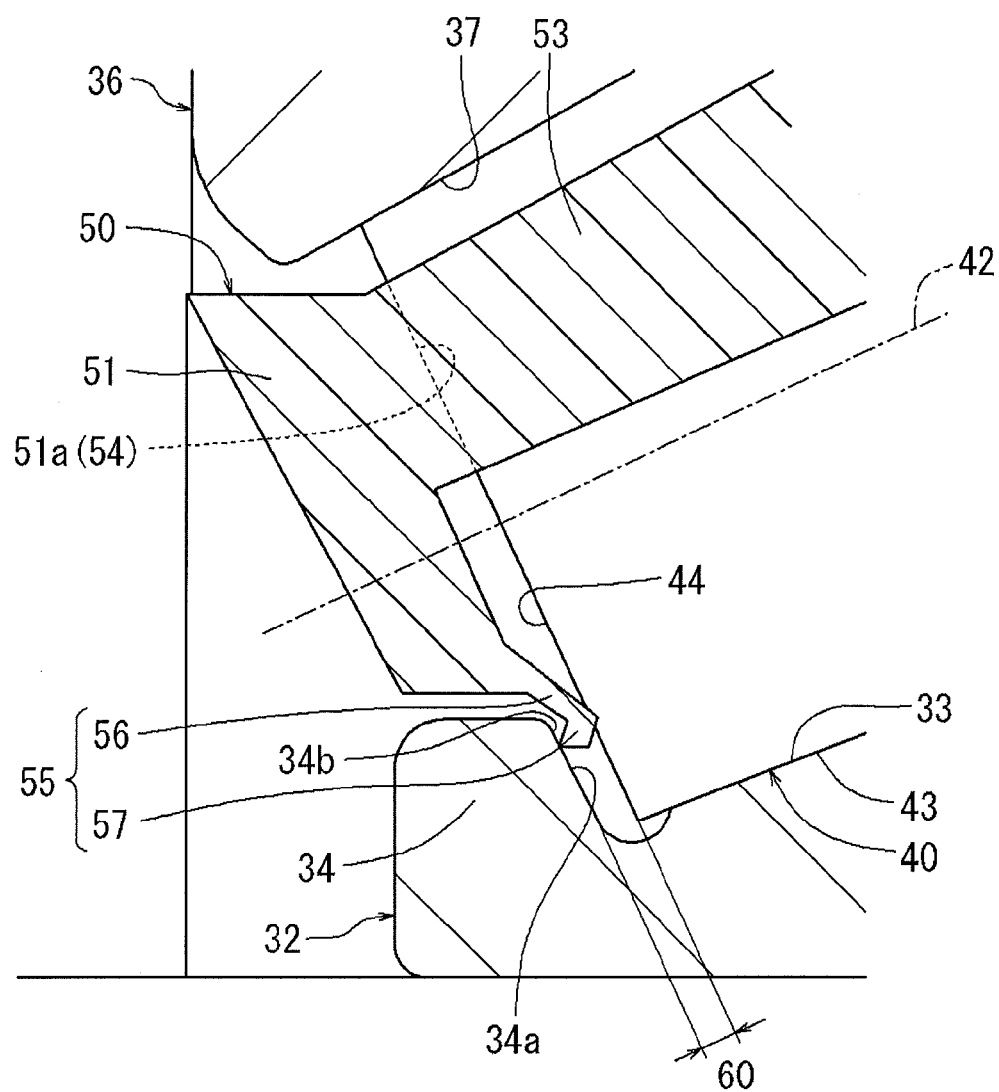
FIG. 5 is an enlarged cross-sectional view in which portion V of FIG. 2 is enlarged.

As shown in FIGS. 2 and 5, the cage 50 includes nail portions 55 each extending from the first annular section 51 to an axially inward small rib end face 34a of the small rib portion 34. Each nail portion 55 supports the tapered roller 40 so as to form a gap 60 between the roller small end face 44 and the small rib end face 34a by contact between the nail portion 55 and the small rib end face 34a. A plurality of the nail portions 55 are formed as shown in FIG. 3, and are disposed so as to be spaced apart in the circumferential direction in the first annular section 51 of the cage 50.

Figure 4:
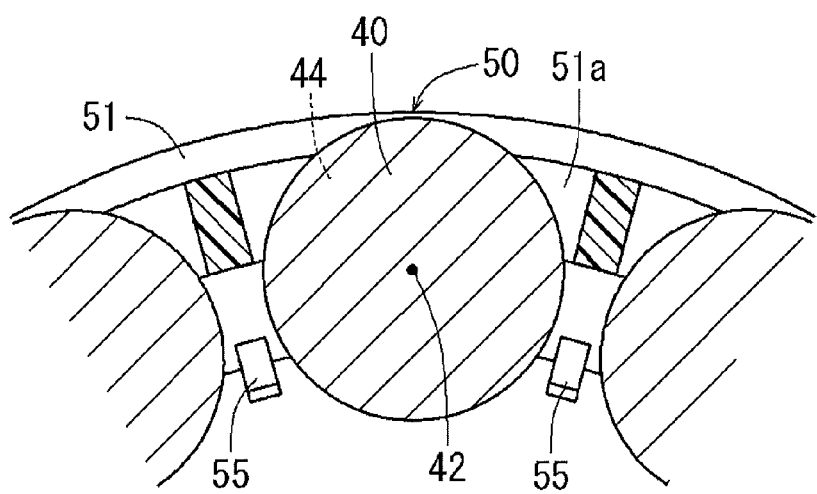
FIG. 4 is a cross-sectional view taken along line IV-IV of FIG. 2.

As shown in FIG. 4, each of the nail portions 55 is disposed in a region of the first annular section 51, which does not overlap the roller small end face 44 in a direction of a central axis 42 of the tapered roller 40, as viewed from the direction of the central axis 42. The nail portion 55 is thus formed at a position corresponding to the cage bar section 53 in the circumferential direction. As shown in FIG. 5, the nail portion 55 includes an extending portion 56 extending to the small rib end face 34a and a projection 57 projecting from the distal end of the extending portion 56 toward the small rib end face 34a. The projection 57 projects to the small rib end face 34a side (direction away from the pocket 54) of a roller small diameter side opposing surface 51a, which faces the roller small end face 44, of the first annular section 51 in the direction of the central axis 42 of the tapered roller 40. Thus, the nail portion 55 supports the tapered roller 40 so as to form the gap 60 between the roller small end face 44 and the small rib end face 34a by the contact between the nail portion 55 and the small rib end face 34a. The projection 57 is preferably in contact with the small rib end face 34a at a position near a radially outward edge portion 34b of the small rib end face 34a. The projection 57 is formed to a tapered shape toward the distal end to suppress the contacting area with the small rib end face. The extending portion 56 is preferably formed in a rod shape. Accordingly, the increase in the weight of the cage 50 can be suppressed, and the nail portion 55 is less likely to be resistance to the lubricating oil flowing through the tapered roller bearing. The extending portion 56 is preferably not elastically deformed with the tapered roller 40 supported so that the amount of the gap 60 does not change. The upward roller displacement at the time of assembling the front bearing 30 thus can be suppressed.

The rear bearing 70 (tapered roller bearing) has a configuration substantially similar to the front bearing 30, and thus the detailed illustration and description thereof will be omitted.

Figure 6:
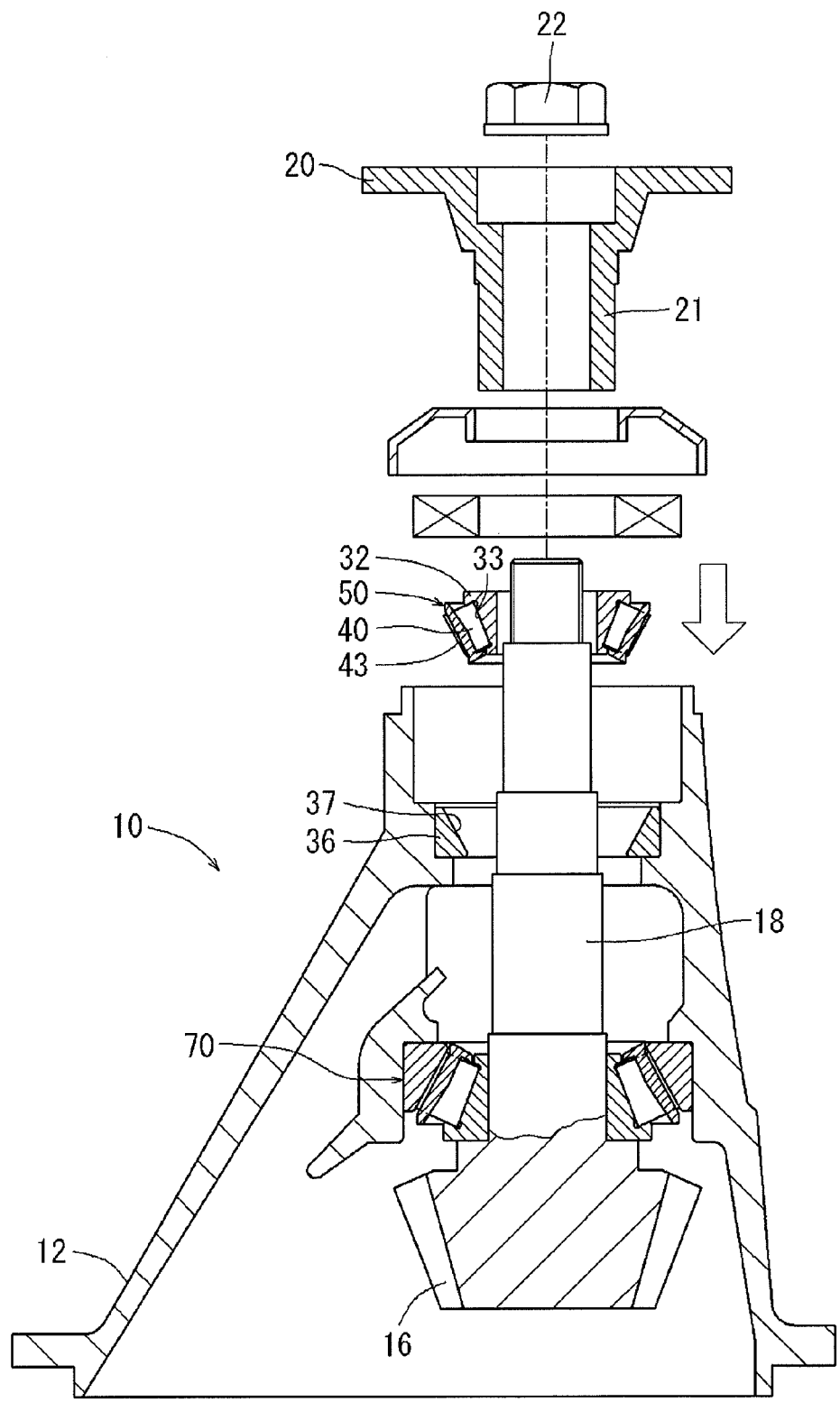
FIG. 6 is a cross-sectional view showing a state of assembling the tapered roller bearing of the present embodiment to the differential device.

An assembly step of the front bearing 30 will be described in an example of the differential device 10 described above. As shown in FIGS. 5 and 6, the outer ring 36 is press-fitted into the differential carrier 12 (housing) in advance. Next, the cage 50 with the tapered rollers 40 accommodated in the pockets 54 (see FIG. 2) of the cage 50 is disposed on the inner ring raceway surface 33 (see FIG. 2) of the inner ring 32 to obtain a three-in-one temporary assembly. The cage 50 is supported by bringing the projections 57 of the nail portions 55 into contact with the small rib end face 34a. The tapered rollers 40 are supported by the roller small diameter side opposing surfaces 51a. The projections 57 each project to the small rib end face 34a side (direction away from the pocket 54) of the roller small diameter side opposing surface 51a in the direction of the central axis 42 of the tapered roller 40. The tapered roller 40 thus can be stably held with the gap 60 provided between the roller small end face 44 and the small rib end face 34a. The three-in-one temporary assembly of the inner ring 32, the cage 50, and the tapered rollers 40 are then inserted from the shaft end of the drive pinion shaft 18. Subsequently, the temporary assembly is fitted until the rolling contact surfaces 43 of the tapered rollers 40 contact the outer ring raceway surface 37 of the outer ring 36. The sleeve 21 of the companion flange 20 is then fastened with the nut 22 to apply pressure from the axial direction. The tapered rollers 40 are subjected to downward roller displacement of being sufficiently sunk until the roller large end faces 45 (see FIG. 2) of the tapered rollers 40 contact the axially inward large rib end face 35a of the large rib portion 35 of the inner ring 32 by the pressuring. After the downward roller displacement is carried out, the contact of the projections 57 of the nail portions 55 and the small rib end face 34a is released. Thus, the torque loss caused by the contact of the cage 50 and the inner ring 32 does not occur when the front bearing 30 is rotated. In the cage 50, the tapered rollers 40 of the three-in-one temporary assembly are held with the gaps 60. Thus, the tapered rollers 40 are each held at a position close to the large rib end face 35a by the amount of the relevant gap 60, whereby the upward roller displacement is suppressed. Accordingly, the downward roller displacement performance in the pressuring described above is enhanced. In particular, the differential device 10 has a mode of assembling the drive pinion shaft 18 in a vertically standing manner, as shown in FIG. 6. In such a case, the tapered rollers 40 in the front bearing 30 tend to move in such a direction that the roller small end faces 44 (see FIGS. 2 and 5) contact the small rib end face 34a (see FIGS. 2 and 5). Thus, the downward roller displacement failure caused by variations in the positions of the tapered rollers 40 is likely to occur. In the cage 50 of the front bearing 30 (see FIG. 2) of the present embodiment, however, the downward roller displacement performance is suitably enhanced by the configuration of the nail portions 55 (see FIG. 5). Note that the rear bearing 70 (see FIG. 1) also has a similar configuration.

According to the front bearing 30 (tapered roller bearing) of the present embodiment, the following effects can be obtained. The cage 50 includes the nail portions 55 extending from the first annular section 51 facing the roller small end faces 44, which are the small diameter side end faces of the tapered rollers 40, to the axially inward small rib end face 34a of the small rib portion 34. The nail portions 55 each support the tapered roller 40 so as to form the gap 60 between the roller small end face 44 and the small rib end face 34a by the contact between the nail portion 55 and the small rib end face 34a. The gap 60 can suppress the upward roller displacement determined by the tapered roller 40 and the inner ring 32. The downward roller displacement performance of the front bearing 30 thus can be enhanced. Furthermore, even if the tapered roller 40 is deviated toward the side opposite to the downward roller displacement direction in the assembly direction of the front bearing 30, the nail portion 55 of the cage 50 forms the gap 60 between the tapered roller 40 and the small rib end face 34a. The upward roller displacement is thereby suppressed and the downward roller displacement failure can be avoided.

Each of the nail portions 55 is formed in a portion of the first annular section 51, which does not overlap the roller small end face 44 in the direction of the central axis 42 as viewed from the central axis 42 of the tapered roller 40, and thus does not inhibit the rolling of the tapered roller 40. The nail portions 55 each include the extending portion 56 and the projection 57. The cage 50 is supported by the contact between the projections 57 of the nail portions 55 and the small rib end face 34a. The tapered rollers 40 are each supported by the roller small diameter side opposing surface 51a. The projections 57 each project to the small rib end face 34a side of the roller small diameter side opposing surface 51a of the first annular section 51 facing the roller small end face 44 in the direction of the central axis 42 of the tapered roller 40. The tapered roller 40 thus can be stably held with the gap 60 provided between the roller small end face 44 and the small rib end face 34a.

The extending portions 56 of the nail portions 55 can suppress the increase in the weight of the cage 50 by being formed in a rod shape. The nail portions 55 are less likely to be resistance to the lubricating oil flowing through the front bearing 30. The projections 57 each contact at the position in the vicinity of the radially outward edge portion 34b of the small rib end face 34a, so that the length of the extending portion 56 can be shortened. The increase in the weight of the cage 50 thus can be further suppressed. Furthermore, the cage 50 is formed from a synthetic resin, and thus can be lightweight. A plurality of the nail portions 55 are formed, and are disposed so as to be spaced apart in the circumferential direction in the first annular section 51 of the cage 50, whereby the tapered rollers 40 can be stably held. The tapered roller bearing is suited for the differential device 10 (power transmission device). The rear bearing 70 (tapered roller bearing) of the present embodiment also has substantially a similar configuration, and has effects similar to the front bearing 30.

The embodiment of the present invention has been described above, but the present invention is not limited to the embodiment, and can be implemented in various other embodiments. In the embodiment described above, the rear differential device of the differential device applied to the four-wheel drive automobile has been described by way of example as the power transmitting device, but the present invention is also applicable to the front differential device. Moreover, the present invention is applicable to various other drive modes such as the drive mode of the front engine front drive and the drive mode of the front engine rear drive. The present invention is also applicable to a tapered roller bearing that supports a shaft built in a gear mechanism of a transmission, and the like.

The present invention can enhance the downward roller displacement performance by suppressing the upward roller displacement determined by the tapered rollers and the inner ring by adopting the above means.

What is claimed is:

1. A tapered roller bearing comprising:
   an inner ring including an outer circumferential surface formed as an inner ring raceway surface in the shape of a conical surface, a small rib portion that projects radially outwardly in a small diameter side end of the inner ring raceway surface, and a large rib portion that projects radially outwardly in a large diameter side end of the inner ring raceway surface;
   an outer ring that is disposed concentrically on an outer circumference side of the inner ring and has an inner circumferential surface formed as an outer ring raceway surface in the shape of a conical surface;
   a plurality of tapered rollers disposed so as to be rollable in an annular space between the inner ring raceway surface and the outer ring raceway surface; and a cage that holds the respective tapered rollers in a plurality of pockets partitioned by annular sections disposed on both axial ends of the tapered rollers and a plurality of cage bar sections that couple the annular sections at the both axial ends and that are disposed in a circumferential direction at intervals; wherein the cage includes a nail portion that extends from a first annular section facing a roller small end face, which is a small diameter side end face of the tapered roller, to an axially inward small rib end face of the small rib portion, and the nail portion supports the tapered roller so as to form a gap between the roller small end face and the small rib end face by contact between the nail portion and the small rib end face.

2. The tapered roller bearing according to claim 1, wherein the nail portion is formed in a region of the first annular section, which does not overlap the roller small end face in a direction of a central axis of the tapered roller, as viewed from the direction of the central axis, and includes an extending portion extending to the small rib end face and a projection projecting from a distal end of the extending portion toward the small rib end face, and the projection projects to a small rib end face side of a roller small diameter side opposing surface of the first annular section facing the roller small end face in the direction of the central axis of the tapered roller.

3. The tapered roller bearing according to claim 2, wherein the extending portion is formed in a rod shape.

4. The tapered roller bearing according to claim 3, wherein the projection contacts with the small rib end face at a position near a radially outward edge portion of the small rib end face.

5. The tapered roller bearing according to claim 4, wherein the cage is formed from a synthetic resin.

6. The tapered roller bearing according to claim 4, wherein a plurality of the nail portions are formed in the first annular section of the cage and are disposed so as to be spaced apart in the circumferential direction.

7. A power transmission device comprising:
the tapered roller bearing according to claim 4.

8. The tapered roller bearing according to claim 3, wherein the cage is formed from a synthetic resin.

9. The tapered roller bearing according to claim 3, wherein a plurality of the nail portions are formed in the first annular section of the cage and are disposed so as to be spaced apart in the circumferential direction.

10. A power transmission device comprising:
the tapered roller bearing according to claim 3.

11. The tapered roller bearing according to claim 2, wherein the projection contacts with the small rib end face at a position near a radially outward edge portion of the small rib end face.

12. The tapered roller bearing according to claim 11, wherein the cage is formed from a synthetic resin.

13. The tapered roller bearing according to claim 11, wherein a plurality of the nail portions are formed in the first annular section of the cage and are disposed so as to be spaced apart in the circumferential direction.

14. A power transmission device comprising:
the tapered roller bearing according to claim 11.

15. The tapered roller bearing according to claim 2, wherein the cage is formed from a synthetic resin.

16. The tapered roller bearing according to claim 2, wherein a plurality of the nail portions are formed in the first annular section of the cage and are disposed so as to be spaced apart in the circumferential direction.

17. A power transmission device comprising:
the tapered roller bearing according to claim 2.

18. The tapered roller bearing according to claim 1, wherein the cage is formed from a synthetic resin.

19. The tapered roller bearing according to claim 1, wherein a plurality of the nail portions are formed in the first annular section of the cage and are disposed so as to be spaced apart in the circumferential direction.

20. A power transmission device comprising:
the tapered roller bearing according to claim 1.

* * * * *